(12) United States Patent
Chen et al.

(10) Patent No.: US 6,935,222 B2
(45) Date of Patent: Aug. 30, 2005

(54) LOCKING DEVICE SUSTAINING HIGH PRESSURE FOR COFFEE MAKER LID

(75) Inventors: Yee Mau Chen, Tai Po (HK); Sum Fat Poon, Tai Po (HK)

(73) Assignee: Electrical and Electronics Limited, Tai Po (HK)

(*) Notice: Subject to any disclaimer, the term of this patent is extended or adjusted under 35 U.S.C. 154(b) by 0 days.

(21) Appl. No.: 10/616,417

(22) Filed: Jul. 9, 2003

(65) Prior Publication Data

US 2005/0005775 A1 Jan. 13, 2005

(51) Int. Cl.[7] .............................. A47J 31/00; A47J 31/40
(52) U.S. Cl. ...................................... 99/302 R; 99/295
(58) Field of Search ............................ 99/302 R, 295, 99/290, 292, 293

(56) References Cited

U.S. PATENT DOCUMENTS

| | | | |
|---|---|---|---|
| 3,470,812 A | * 10/1969 | Levinson | 99/295 |
| 4,254,694 A | 3/1981 | Illy | |
| 4,429,623 A | 2/1984 | Illy | |
| 4,741,260 A | 5/1988 | Bolivar | |
| 4,882,982 A | 11/1989 | Muttoni | |
| 5,197,374 A | 3/1993 | Fond | |
| 5,388,502 A | 2/1995 | Hufnagl | |
| 5,526,733 A | 6/1996 | Klawuhn et al. | |
| 5,531,152 A | 7/1996 | Gardosi | |
| 5,638,741 A | 6/1997 | Cisaria | |
| 5,649,472 A | 7/1997 | Fond et al. | |
| 5,794,519 A | * 8/1998 | Fischer | 99/295 |
| 5,921,168 A | * 7/1999 | Nello | 99/295 |
| 6,009,792 A | 1/2000 | Kraan | |
| 6,021,705 A | 2/2000 | Dijs | |
| 6,119,582 A | 9/2000 | Akkerman-Theunisse | |
| 6,481,338 B1 | 11/2002 | Wai | |
| 6,490,966 B2 | 12/2002 | Mariller et al. | |
| 6,698,332 B2 | 3/2004 | Kollep et al. | |
| 6,748,850 B1 | 6/2004 | Kraan | |
| 2001/0050002 A1 | 12/2001 | Bonanno | |
| 2002/0022070 A1 | 2/2002 | Dijs | |
| 2002/0148356 A1 | 10/2002 | Lazaris et al. | |
| 2003/0089245 A1 | 5/2003 | Kollep et al. | |

FOREIGN PATENT DOCUMENTS

| | | |
|---|---|---|
| CH | 337633 | 4/1959 |
| EP | 1000574 | 5/2000 |
| EP | 1169956 | 1/2002 |
| WO | WO 01/15582 A1 | 3/2001 |
| WO | WO 02/19876 A1 | 3/2002 |
| WO | WO 2004/028318 A1 | 4/2004 |

* cited by examiner

*Primary Examiner*—Reginald L. Alexander
(74) *Attorney, Agent, or Firm*—Law Offices of Albert Wai-Kit Chan, LLC

(57) ABSTRACT

This invention provides a locking device sustaining high pressure in a coffee maker which comprises a brew head assembly which comprises: a slide assembly, a sealing assembly and a pop-up and roll-back assembly, operatively linked to sustain pressure up to four (4) bars. Furthermore, this invention provides a method for one-hand operation on the locking of a coffee maker comprising steps of: a) Using one hand to put the lever forward to release the lock which is controlled by two parts, the slider and the three mounts on the brew base wherein the back-and-forth movement of the slider will produce the action of locking and releasing; b) Moving the lever forward, produce the push rod that is assembled on the slider will push the slider forward so the brew head is released; c) Putting back the lever, the push rod will put back the slider so the brew head is locked; and d) after releasing the lock, the lift platform will pop up by the lift platform spring and the lid mount roll up by the hinge spring.

12 Claims, 6 Drawing Sheets

POP UP

LOCKING DEVICE SUSTAINING HIGH PRESSURE FOR COFFEE MAKER LID

BACKGROUND OF THE INVENTION

This invention relates to the locking mechanism of a coffee maker using coffee pods.

The original drip-type coffee maker using ground coffee does not create any pressure and thus does not need a locking mechanism to prevent leaking. The pump espresso and automatic espresso coffee machines need a locking mechanism with more than five (5) bar back pressure to prevent leaking.

A coffee maker using coffee pods normally creates one (1) to three point five (3.5) bar pressure on the machine. Thus, a locking mechanism that is used in espresso machines with more than five (5) pressure bars is not necessary. Instead, a locking mechanism that tolerates a back pressure of up to four (4) bars is needed for the coffee maker using coffee pods.

The existing pump espresso and automatic espresso machines use an aluminum filter cup and flat silicone ring for sealing to achieve the level of tightness and closeness needed to tolerate more than five (5) pressure bars. In the known art, the operation requires that the locking mechanism be turned in a horizontal direction.

The advantage of this invention is that the mechanism requires less force to use and is easier to operate. The pop-up and roll-back brew head is designed to let the brew head rise up automatically. In addition, this invention facilitates the operator's use of only one hand to lock and release the brew head.

SUMMARY OF THE INVENTION

The brew head assembly can be considered as three main parts; a slide assembly, a sealing assembly, and a pop-up and roll-back assembly.

The slide assembly is made up of a lever, a slider part, a slider spring, and a lid frame. These parts are assembled together after molding.

The sealing assembly is made up of an "O" ring, a water spreader top, a seal ring, a water spreader bottom, a metal pod filter, a coffee collector, and a brew head bottom. These parts are assembled together.

The pop-up and roll-back assembly is made up of a lift platform, a lift platform spring, hinge pins, a hinge spring, and a brew head base. These parts are assembled together.

The invention is designed to be used as follows: the brew head assembly is normally closed on the machine. Before brewing coffee, a coffee pod should be placed in the metal pod filter. To release the lock on the brew head, the operator needs only one hand to push the lever forward.

The lock is controlled by two parts: the three legs of the slider and the three mounts on the brew base. The forward and backward movements of the slider will produce the locking and releasing actions. When the lever is pushed forward, the push rod that is assembled on the slider will push the slider forward so that the brew head is released. When the lever is pulled back, the push rod will put back the slider so that the brew head is locked.

After the lock is released, the lift platform spring will cause the lift platform to pop up. The hinge spring rolls up the lid mount.

The seal function depends on the seal ring. The special shape of the seal ring can bear the one (1) to four (4) bar pressure. During the brewing cycle, the back pressure on the pod will raise the sealing assembly a little bit. The small gap allows the two flaps on the seal ring to extend slightly. This extension of the flap end can improve the sealing. This little rise up of the seal ring helps to better adjust the thickness of brewed coffee.

DETAILED DESCRIPTION OF THE FIGURES

The invention relates to the one-hand operation of a locking mechanism with one (1) to four (4) bar back pressure. The concept of this invention is shown in FIG. 1 to FIG. 6.

DETAILED DESCRIPTION OF THE INVENTION

This locking mechanism is for one-hand operation and tolerates up to four (4) pressure bars. The locking mechanism is mainly used on the pod-type machine and the spoon-brewer machine.

To prevent water from leaking, a silicone rubber seal ring is used on the brew head. The silicone rubber seal is fixed in between the water spreader top and water spreader bottom. The operation of the locking mechanism is as follows: When the lever is pushed back and the slider moves, three legs on the slider will fit the holes on the brew head bottom. The fitting will keep the seal ring pressed down to the metal pod filter. At this stage, the brew cycle can be started, and the back pressure above the pod will make the slider rise up slightly. The special shape of the seal ring will make for better sealing. As the brewing is done, the user may use one hand to pull the lever. The slider will move backward and release the lock. The brew head will pop up and roll back. Opening and closing the brew head is thus made easy.

Figure 2:
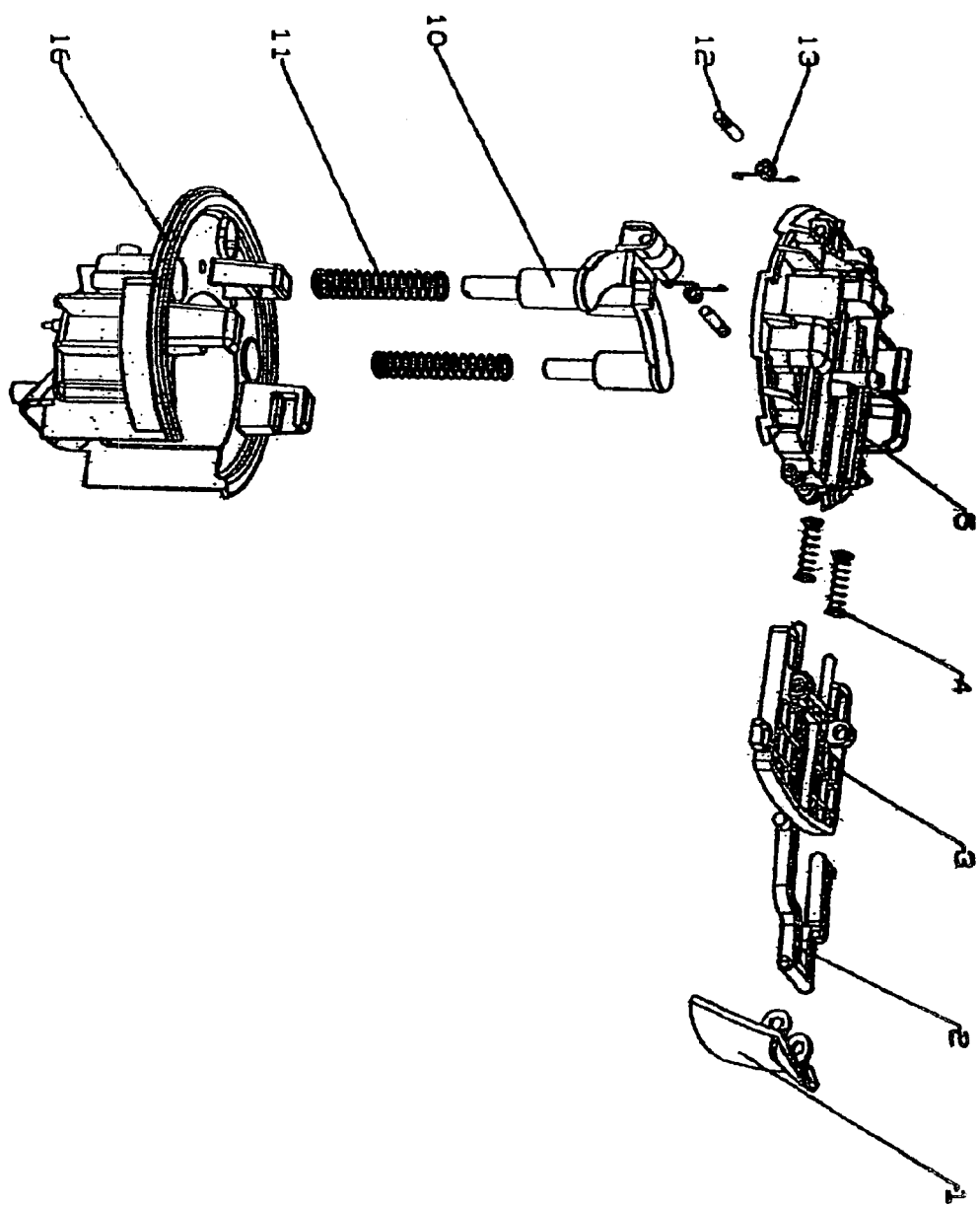
FIG. 2 is an exploded view of the sliding assembly and the pop-up and roll-back assembly.

FIG. 2 is the exploded view showing the components of the slider assembly and the pop-up and roll-back assembly. As shown, lever 1 is pulled out for un-latching. The push rod 2 links the slider 3 and the lever 1. The slider is made of aluminum material to render sturdier support. The slider spring 4 is used to prevent the lever 1 fall back in un-latch stage. Parts 1 to 4 are fixed on the lid mount 5. Parts 1 to 5 make up the slider assembly. The other parts are for the pop-up and roll-back action. Brew head base 6 is the base which links the whole assembly. Lift platform 10 is the part that links the slider assembly to the brew head base 16. The hinge pin 12 is to fix the hinge spring 13 and the slider assembly to the lift platform. The lift platform 10 is also made of aluminum to provide stronger support. The lift platform spring 11 is placed on the two legs of the lift platform 10 to make the pop-up action. The hinge spring 13 is used for the roll-back action.

Figure 1:
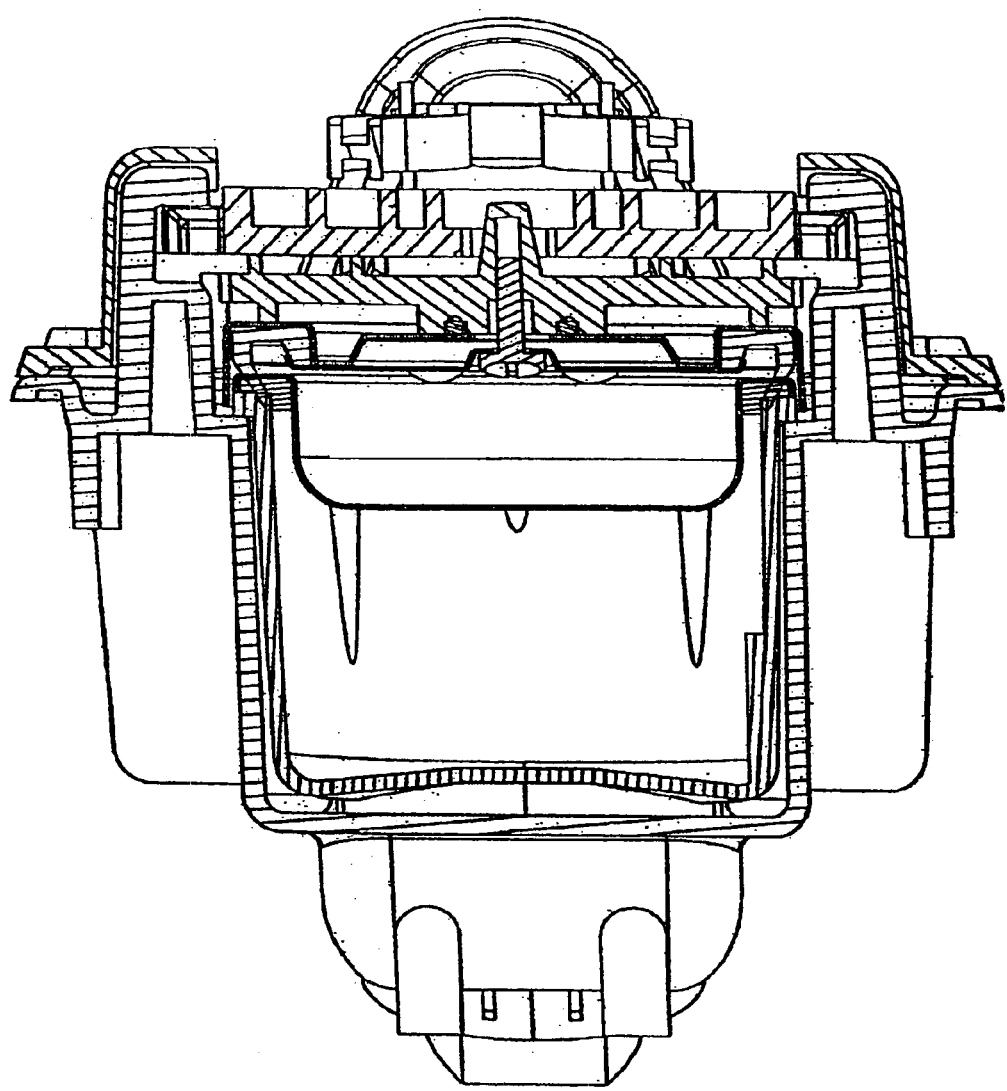
FIG. 1 is a cross-sectional illustration of the brew head assembly.
Figure 3:
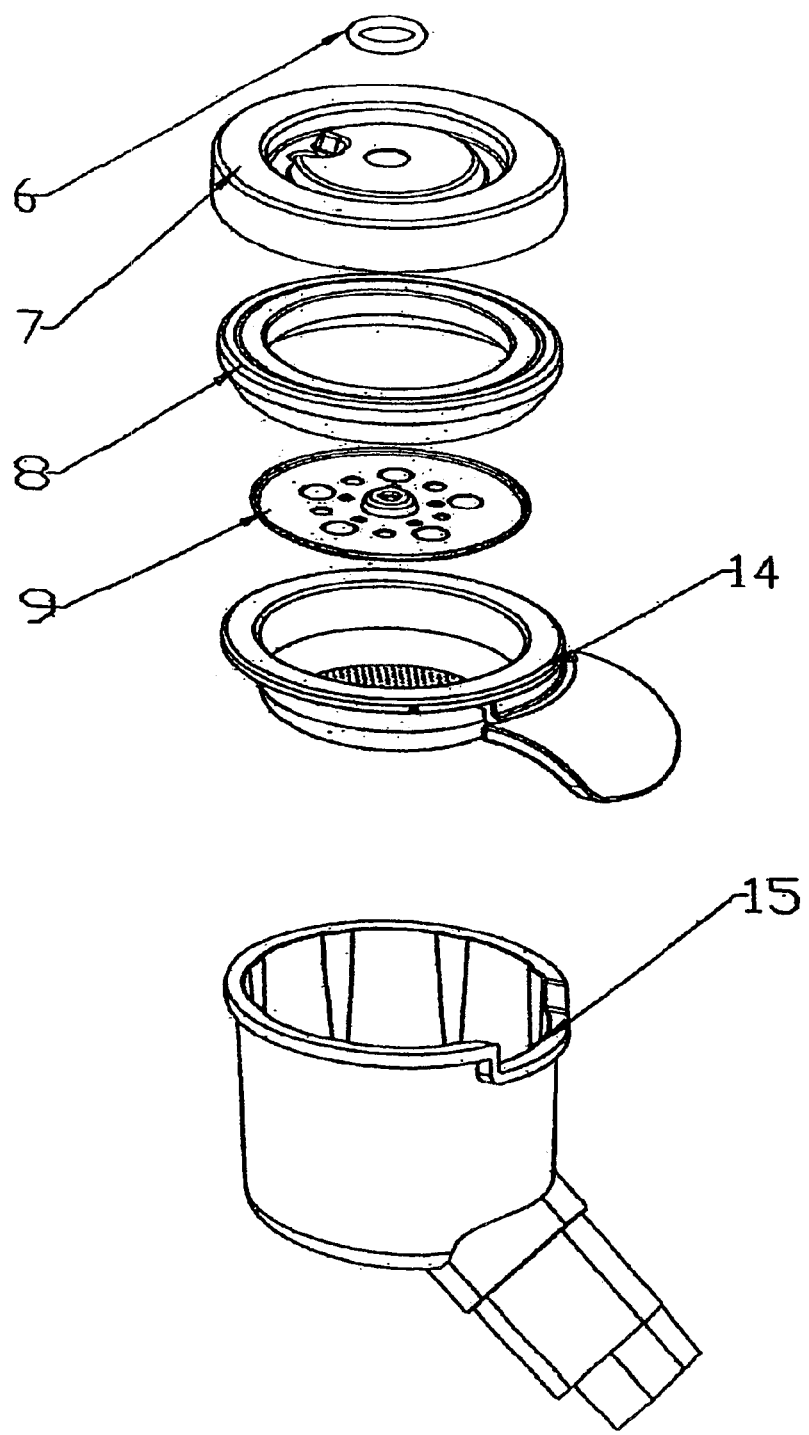
FIG. 3 is an exploded view of the sealing assembly.
Figure 4:
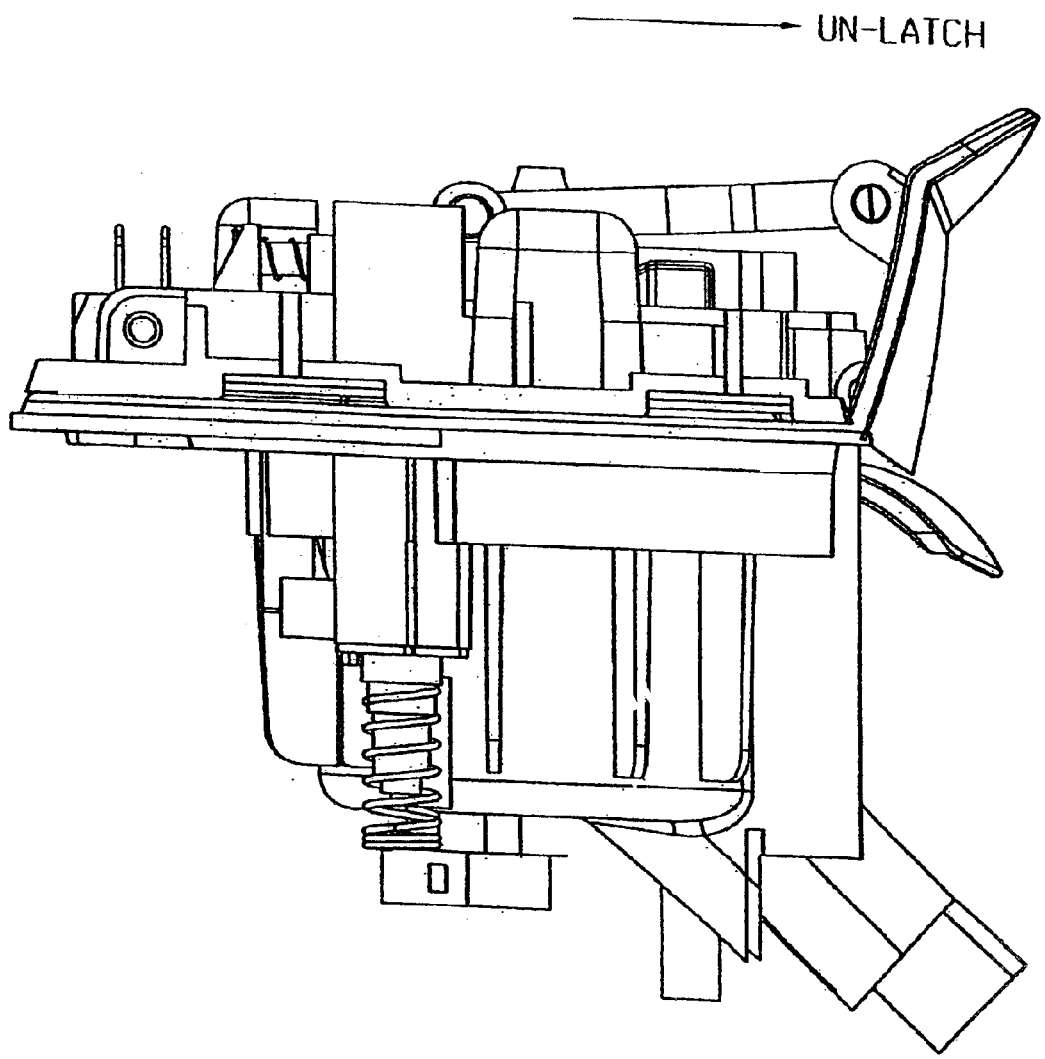
FIG. 4 is a side view of the un-latch action.
Figure 5:
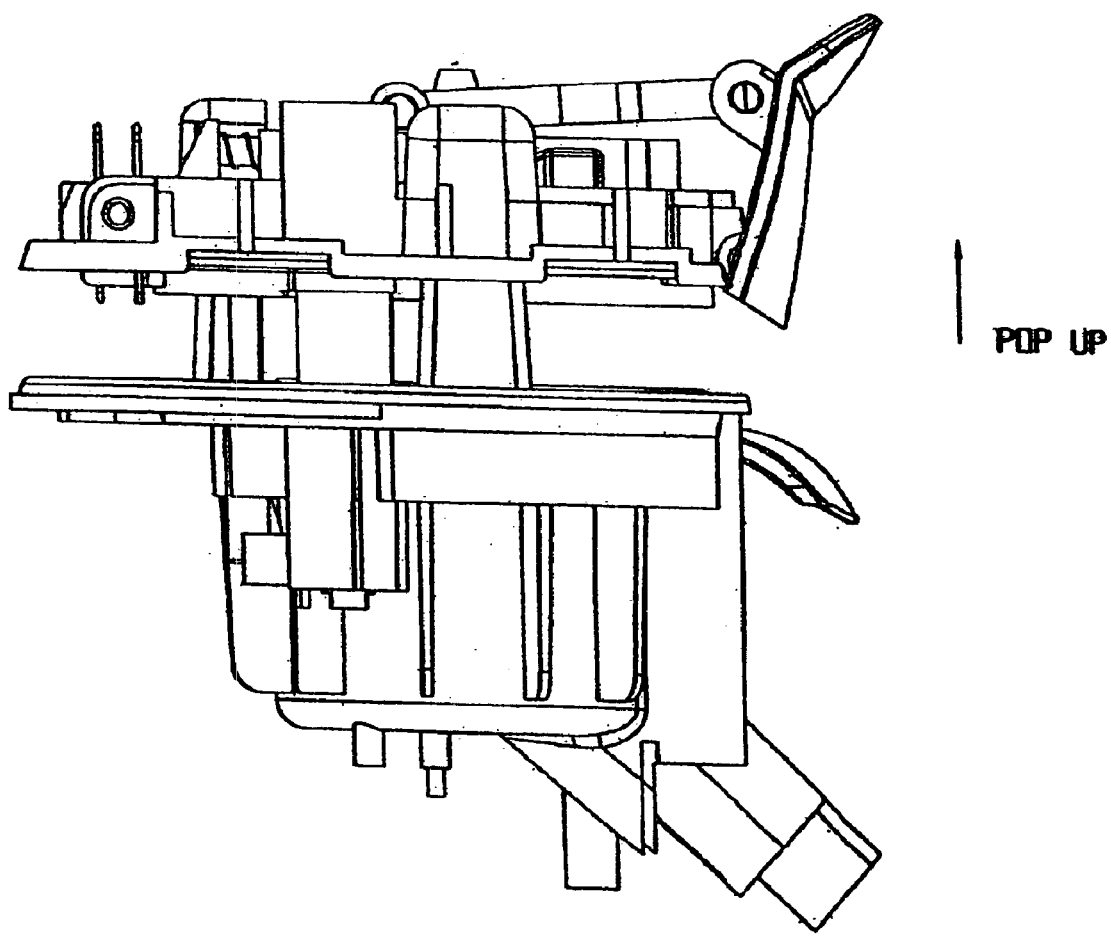
FIG. 5 is a side view of the pop-up action.
Figure 6:
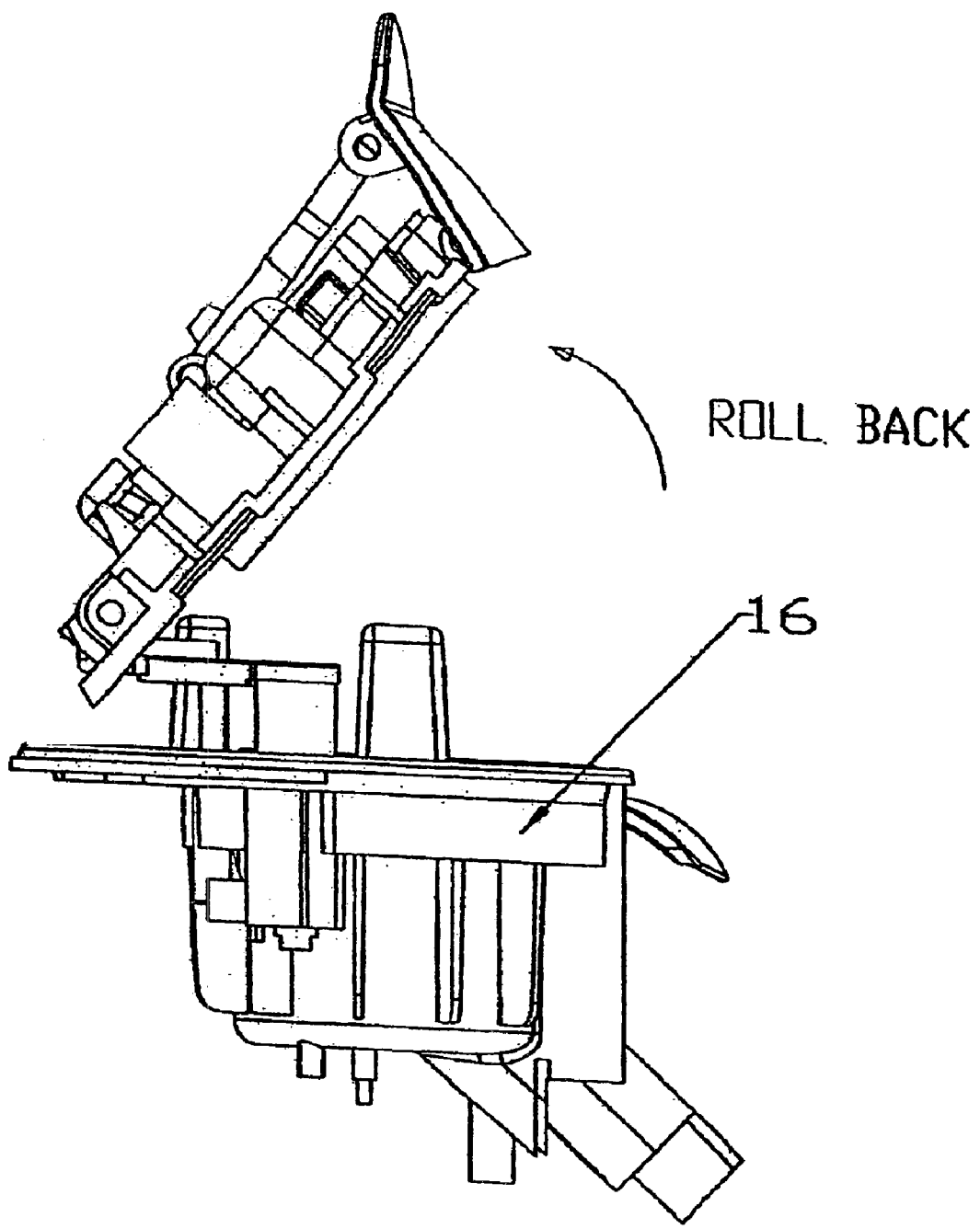
FIG. 6 is side view of roll-back action.

FIG. 3 is the sealing assembly. From the FIG. 1, it can be seen that the sealing assembly are mounted on the under side of the lid mount 5. This "O" ring 6 is used to prevent the leaking of water between the water spreader top and the lid mount. The water spreader top 7 and the water spreader bottom 9 are to press the seal ring 8 and are mounted on the lid mount 5 by screw. The round with two flaps on upper and lower seal rings 8 is for the sealing on the brew head. The material of seal ring 8 is silicone rubber. The metal pod filter 14 is used for the placing of the coffee pod. The upper rim is to help sealing. The coffee collector 15 is for the brewed coffee, which flows to the outside through a spout below which the cup is placed. The top rim on the coffee collector is also for sealing.

This invention provides a brew head assembly of a coffee maker comprising: a slide assembly, a sealing assembly and a pop up and roll-back assembly, all operatively linked to sustain pressure of up to four (4) bars.

This invention provides a slide assembly comprising a lever, a slider part, a slider spring, and a lid frame. In an embodiment, the slide assembly is as set forth in FIG. 2.

This invention provides a sealing assembly comprising an "O" ring, a water spreader top, a seal ring, a water spreader bottom, a metal pod filter, a coffee collector, and a brew head bottom. In an embodiment, the sealing assembly is set forth in FIG. 3.

The shape of the seal ring may be round with a two-flap end. The materials include but are not limited to silicone rubber. Other materials may be used provided that they are capable of withstanding pressure up to four (4) bars.

The metal pod filter creates the back pressure for a little rise-up in the sealing assembly.

This invention provides a pop-up and roll-back assembly comprising a lift platform, a lift platform spring, a hinge pins, a hinge spring and a brew head base. In an embodiment, the pop-up and roll-back assembly is set forth in FIG. 1.

This invention provides a lift platform comprising at least two legs for pop-up action. In an embodiment, the roll up of a lid mount is by the hinge spring.

This invention provides a method for one-hand operation on the locking of a coffee maker comprising steps of:

a) Using one hand to put the lever forward to release the lock which is controlled by two parts, the slider and the three mounts on the brew base wherein the back-and-forth movement of the slider will produce the action of locking and releasing;

b) Moving the lever forward, the push rod that is assembled on the slider will push the slider forward so the brew head is released;

c) Putting back the lever, the push rod will put back the slider so the brew head is locked; and d) After releasing the lock, the lift platform will pop up by the lift platform spring and the lid mount roll up by the hinge spring.

In an embodiment, the slider comprises at least three legs 18.

In another embodiment, the counter side holes 17 for locking are on the brew head base.

What is claimed is:

1. A brew head assembly of a coffee maker comprising: a slide assembly, a sealing assembly, and a pop-up and roll-back assembly, operatively linked to sustain pressure up to four (4) bars, wherein the slide assembly comprises a lever, slider part, slider spring, and a lid frame.

2. The brew head of claim 1, wherein the pop-up and roll-back assembly comprises a lift platform, a lift platform spring, a hinge pins a hinge spring, and a brew head base.

3. The brew head of claim 2, wherein the lift platform comprises at least two legs for pop-up action.

4. The brew head of claim 2, wherein the roll up of the lid mount is by the hinge spring.

5. A brew head assembly of a coffee maker comprising: a slide assembly, a sealing assembly, and a pop-up and roll-back assembly, operatively linked to sustain pressure up to four (4) bars, wherein the sealing assembly comprises an "O" ring, a water spreader top, a seal ring, a water spreader bottom, a metal pod filter, a coffee collector, and a brew head bottom.

6. The brew head of claim 5, wherein the shape of the seal ring is round with a two-flap end capable of withstanding pressure up to four (4) bars.

7. The brew head of claim 6, wherein the seal ring is made of silicone rubber.

8. The brew head of claim 5, wherein the metal pod filter creates a back pressure for a little rise up of the sealing assembly.

9. A brew head assembly of a coffee maker comprising: a slide assembly, a sealing assembly, and a pop-up and roll-back assembly, operatively linked to sustain pressure up to four (4) bars, wherein the slide assembly comprises:

a lever;

a slider operatively linked to the lever by a push rod; and a slider spring, wherein the lever, the slider, the push rod and the slider spring are operatively fixed on a lid mount.

10. A brew head assembly of a coffee maker comprising: a slide assembly, a sealing assembly, and a pop-up and roll-back assembly, operatively linked to sustain pressure up to four (4) bars, wherein the sealing assembly comprises:

an "O" ring a water spreader top;

a seal ring;

a water spreader bottom;

a metal pod filter; and a coffee collector.

11. The sealing assembly of claim 10, wherein the seal ring is made of silicone rubber or other suitable material capable of preventing leaks at pressure of up to four (4) bars.

12. A brew head assembly of a coffee maker comprising: a slide assembly, a sealing assembly, and a pop-up and roll-back assembly, operatively linked to sustain pressure up to four (4) bars, wherein the pop-up and roll-back assembly comprises:

a lift platform having at least two legs operatively moveably attached to a brew head base, wherein a lift platform spring is placed on at least one leg of the lift platform; and a hinge pin which operatively links a hinge spring and the slide assembly to the lift platform.

* * * * *